United States Patent
Takagi (10) Patent No.: US 10,114,209 B2
(45) Date of Patent: Oct. 30, 2018

(54) MICROSCOPE APPARATUS

(71) Applicant: OLYMPUS CORPORATION, Shibuya-ku, Tokyo (JP)

(72) Inventor: Kosuke Takagi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 348 days.

(21) Appl. No.: 14/559,611

(22) Filed: Dec. 3, 2014

(65) Prior Publication Data

US 2015/0153557 A1    Jun. 4, 2015

(30) Foreign Application Priority Data

Dec. 4, 2013   (JP) .................................. 2013-251277

(51) Int. Cl.
*G02B 21/36*   (2006.01)
*G02B 21/16*   (2006.01)
*G02B 21/06*   (2006.01)

(52) U.S. Cl.
CPC ........... *G02B 21/365* (2013.01); *G02B 21/06* (2013.01); *G02B 21/16* (2013.01)

(58) Field of Classification Search
CPC .................................................. G02B 21/365
USPC ........................................................ 348/79
See application file for complete search history.

(56) References Cited

U.S. PATENT DOCUMENTS

| | | | |
|---|---|---|---|
| 6,744,471 B1 * | 6/2004 | Kakinuma | H04N 5/235 348/216.1 |
| 6,804,385 B2 | 10/2004 | Eisfeld et al. | |
| 7,092,557 B2 | 8/2006 | Eisfeld et al. | |
| 8,175,370 B2 | 5/2012 | Takagi et al. | |

(Continued)

FOREIGN PATENT DOCUMENTS

| | | |
|---|---|---|
| JP | 2005291720 A | 10/2005 |
| JP | 2005321728 A | 11/2005 |

(Continued)

OTHER PUBLICATIONS

Japanese Office Action (and English translation thereof) dated Jun. 20, 2017, issued in counterpart Japanese Application No. 2013-251277.

*Primary Examiner* — Jonathan R Messmore
(74) *Attorney, Agent, or Firm* — Holtz, Holtz & Volek PC (57) ABSTRACT

A plurality of specimens or a plurality of targets in a specimen are accurately examined. A microscope apparatus includes a light source; an image-generating unit generating an image of a specimen; a control unit controlling the light source and the image-generating unit depending on a predetermined irradiation condition or a predetermined image generation condition; an image-analyzing unit analyzing the image generated by the image-generating unit to extract targets; and a condition-changing unit changing the irradiation condition and/or the image generation condition based on a difference between an actual luminance of each of the extracted targets in the image and a desired luminance such that the actual luminance of the target in the image satisfies (Continued)

the desired luminance. If the irradiation condition and/or the image generation condition is changed, the control unit redrives the light source and the image-generating unit depending on the changed irradiation condition and/or image generation condition.

5 Claims, 8 Drawing Sheets

(56) References Cited

U.S. PATENT DOCUMENTS

| | | |
|---|---|---|
| 8,218,840 B2 | 7/2012 | Eisfeld et al. |
| 8,712,139 B2 | 4/2014 | Rittscher et al. |
| 2006/0251314 A1 | 11/2006 | Eisfeld et al. |
| 2009/0191619 A1 | 7/2009 | Eisfeld et al. |
| 2010/0049058 A1* | 2/2010 | Ishihara ............... A61B 1/043 600/477 |
| 2011/0109644 A1* | 5/2011 | Geutskens ............. G06F 3/017 345/589 |
| 2012/0205519 A1 | 8/2012 | Möhler et al. |

FOREIGN PATENT DOCUMENTS

| | | | |
|---|---|---|---|
| JP | 2008043244 A | | 2/2008 |
| JP | 2009063509 A | | 3/2009 |
| JP | 2010263872 A | | 11/2010 |
| JP | 2011515673 A | | 5/2011 |
| JP | 2011206066 A | | 10/2011 |
| JP | 2012128354 A | * | 7/2012 |
| JP | 2013109119 A | | 6/2013 |
| WO | 2009115571 A1 | | 9/2009 |

\* cited by examiner

| CELL LUMINANCE | CONDITIONS |
|---|---|
| 100~200 | LASER POWER:SETTING 1<br>GAIN:** |
| 201~400 | LASER POWER:SETTING 2<br>GAIN:XX |

MICROSCOPE APPARATUS

CROSS-REFERENCE TO RELATED APPLICATIONS

This application is based on Japanese Patent Application No. 2013-251277, the contents of which are incorporated herein by reference.

TECHNICAL FIELD

The present invention relates to microscope apparatuses.

BACKGROUND ART

In the related art, there are known microscope apparatuses for examining both a high-luminance region and a low-luminance region of a specimen (see, for example, Japanese Unexamined Patent Application Publication No. 2012-128354 and U.S. Patent Application Publication No. 2012/0205519). The microscope apparatus disclosed in JP 2012-128354 switches the intensity of laser light with which a specimen is irradiated from high intensity to low intensity to generate a plurality of images with different fluorescence intensities and combines these images to acquire a combined image with a wide dynamic range so that both a high-luminance region and a low-luminance region of the specimen can be examined. The microscope apparatus disclosed in US 2012/0205519 executes gain correction on the luminance of each pixel in an image of a specimen so that both a high-luminance region and a low-luminance region of the specimen can be examined.

SUMMARY OF INVENTION

Technical Problem

However, the microscope apparatus disclosed in JP 2012-128354, which irradiates a specimen with laser light multiple times to generate a plurality of images, requires much time for image acquisition, which may result in decreased examination accuracy as fluorescence fades. For the microscope apparatus disclosed in US 2012/0205519, in which cells are not identified, it is difficult to set the optimum capturing conditions for each examination target; therefore, noise, such as dust, which is not to be examined, may be misidentified as part of the specimen and selected as an examination target.

The present invention provides a microscope apparatus that allows accurate examination of a plurality of examination specimens or a plurality of examination targets in a specimen under the optimum examination conditions.

Solution to Problem

An aspect of the present invention is a microscope apparatus including a light source that emits illumination light; an image-generating unit that generates an image of a specimen by detecting fluorescence emitted from the specimen when the specimen is irradiated with the illumination light emitted from the light source; a control unit that controls the light source and the image-generating unit depending on a predetermined irradiation condition or a predetermined image generation condition; an image-analyzing unit that analyzes the image generated by the image-generating unit to extract examination targets in the specimen; and a condition-changing unit that changes the irradiation condition and/or the image generation condition based on a difference between an actual luminance of each of the examination targets extracted by the image-analyzing unit in the image and a desired luminance such that the actual luminance of the examination target in the image satisfies the desired luminance. If the condition-changing unit changes the irradiation condition and/or the image generation condition, the control unit redrives the light source and the image-generating unit depending on the changed irradiation condition and/or image generation condition.

According to the above aspect, under the control of the control unit, the light source emits illumination light under the predetermined irradiation condition, and the illumination light is directed onto the specimen. The image-generating unit detects fluorescence emitted from the specimen to generate an image under the predetermined image generation condition. The control unit redrives the light source and the image-generating unit depending on the irradiation condition and/or image generation condition changed by the condition-changing unit for each of the examination targets in the specimen extracted by the image-analyzing unit in the image such that the actual luminance of the examination target in the image satisfies the desired luminance.

In the above configuration, the control unit may use an irradiation condition and/or image generation condition changed for each of the examination targets, for each pixel in the image, or for each region containing a plurality of pixels.

In the above configuration, the condition-changing unit may change the irradiation condition and/or the image generation condition based on a table or calculation formula that associates the examination targets with the desired luminance.

Advantageous Effects of Invention

The present invention provides the advantage of allowing accurate examination of a plurality of examination specimens or a plurality of examination targets in a specimen under the optimum examination conditions.

DESCRIPTION OF EMBODIMENTS

A microscope apparatus according to an embodiment of the present invention will now be described with reference to the drawings.

Figure 1:
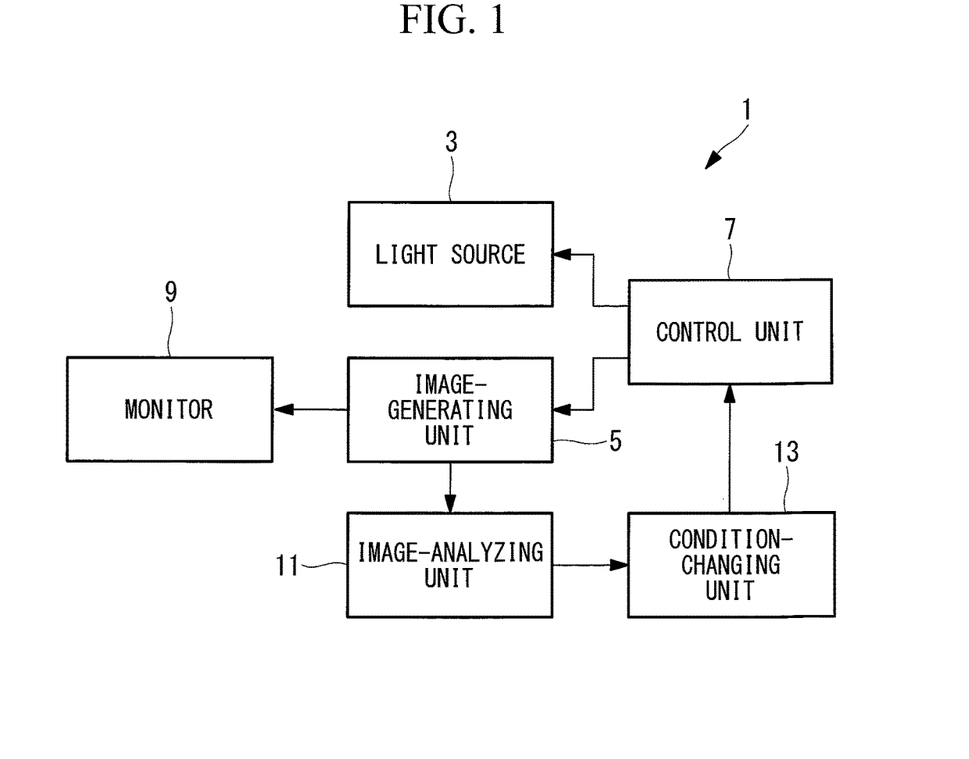
FIG. 1 is a block diagram schematically illustrating a microscope apparatus according to an embodiment of the present invention.

As shown in FIG. 1, a microscope apparatus 1 according to this embodiment includes a light source 3 that emits laser light (illumination light); an image-generating unit 5 that generates an image of a specimen S, such as a cell (see, for example, FIG. 2), by detecting fluorescence emitted from the specimen S when the specimen S is irradiated with the laser light emitted from the light source 3; a control unit 7 that controls the light source 3 and the image-generating unit 5; a monitor 9 that displays the image generated by the image-generating unit 5; an image-analyzing unit 11 that analyzes the image generated by the image-generating unit 5; and a condition-changing unit 13 that changes the irradiation condition of the light source 3 and the image generation condition of the image-generating unit 5 based on analytical results from the image-analyzing unit 11. The microscope apparatus 1 also includes an examination optical system (not shown) including a scanner that scans the laser light emitted from the light source 3 across the specimen S two-dimensionally.

A charge-coupled device (CCD) may be used as the image-generating unit 5, and the image-generating unit 5 transmits an image signal of a generated image to the monitor 9 and the image-analyzing unit 11.

The control unit 7 executes precapturing, in which the control unit 7 controls the light source 3 and the image-generating unit 5 depending on a predetermined irradiation condition and a predetermined image generation condition to capture an image of the specimen S, and main capturing, in which the control unit 7 redrives the light source 3 and the image-generating unit 5 depending on the irradiation condition and image generation condition changed by the condition-changing unit 13 to capture an image of the specimen S again. For example, precapturing may be executed one day or one hour before main capturing.

The irradiation condition is, for example, the laser power, which indicates the intensity of the laser light, whereas the image generation condition is, for example, the gain by which the image signal to be output from the image-generating unit 5 is amplified. In precapturing, compared to main capturing, a rougher image is captured with, for example, a lower laser power or a lower gain. Precapturing may be executed again if the average luminance of the specimen S in the image captured by precapturing falls below a predetermined level.

Figure 2:
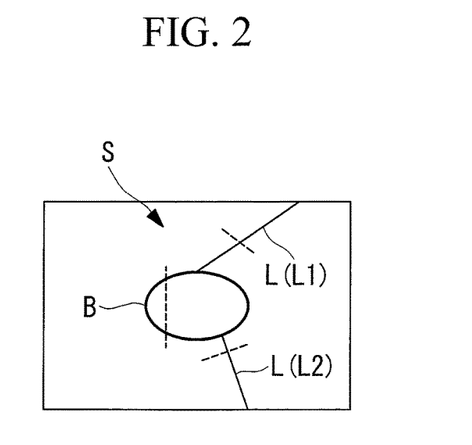
FIG. 2 is a diagram illustrating a cell as an example of a specimen examined under the microscope apparatus in FIG. 1.

The image-analyzing unit 11 identifies the specimen S, such as the cell shown in FIG. 2, for example, according to the size, shape, or luminance thereof, to distinguish the specimen S from noise such as dust. This prevents noise such as dust from being misidentified as part of the specimen S and selected as an examination target.

The image-analyzing unit 11 extracts, for example, a cell body B and a plurality of neurites L (L1 and L2) in the identified cell as individual examination targets. The image-analyzing unit 11 assigns a cell number to the cell including the extracted examination targets for identification. The image-analyzing unit 11 detects the position and average luminance of each extracted examination target. The image-analyzing unit 11 may also detect, for example, the size, thickness, or length of the neurites L1 and L2.

The condition-changing unit 13 compares the actual luminance of each examination target extracted by the image-analyzing unit 11 in the image with the desired luminance and, based on the ratio thereof, changes the irradiation condition and the image generation condition for the examination target such that the actual luminance in the image satisfies the desired luminance.

For example, the condition-changing unit 13 stores template data indicating the desired luminance for each examination target and multiplies the laser power, serving as the irradiation condition, and the gain, serving as the image generation condition, by a real number so as to satisfy the luminance indicated by the template data for each examination target. For example, the luminances of the plurality of neurites L1 and L2 may be normalized to a certain luminance.

Figure 3:
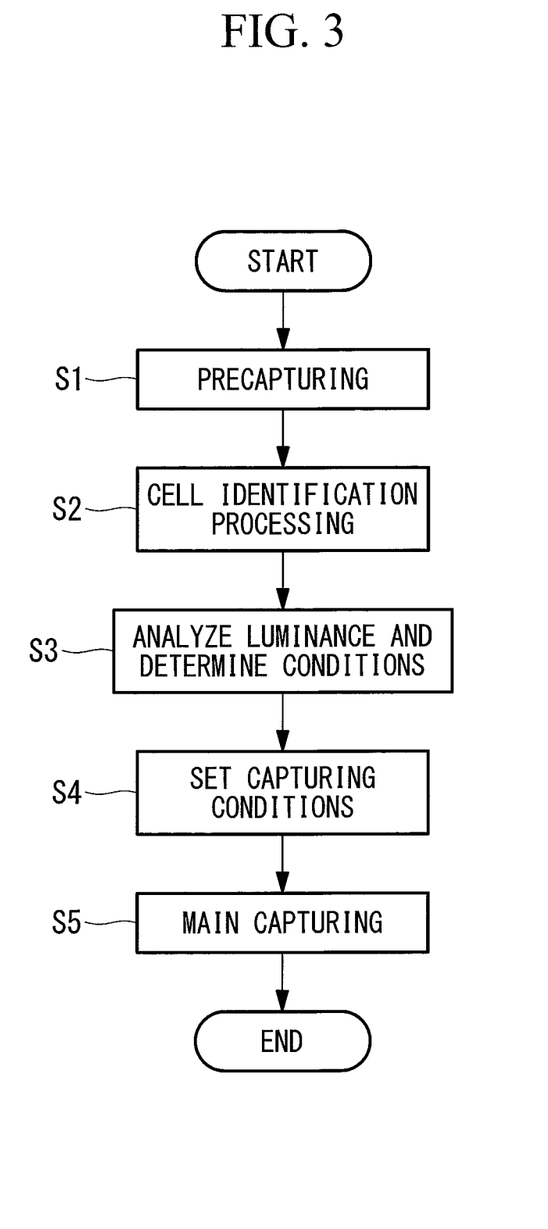
FIG. 3 is a flowchart illustrating the examination of the specimen under the microscope apparatus in FIG. 1.

The operation of the thus-configured microscope apparatus 1 will now be described with reference to the flowchart in FIG. 3.

The examination of the specimen S under the microscope apparatus 1 according to this embodiment begins with the precapturing of the specimen S (step S1).

Under the control of the control unit 7, the light source 3 emits laser light with a predetermined laser power, and the laser light is directed onto the specimen S. The image-generating unit 5 detects fluorescence emitted from the specimen S to generate an image of the specimen S. The neurites L1 and L2 in the image captured by precapturing may have lower luminances and thus be less visible than the cell body B.

The image-generating unit 5 amplifies the image signal of the generated image by a predetermined gain and transmits it to the image-analyzing unit 11. The image-analyzing unit 11 analyzes the image signal received from the image-generating unit 5 to identify the specimen S, i.e., a cell, and extracts the cell body B and the neurites L1 and L2, as shown in FIG. 2, as examination targets (step S2). The image-analyzing unit 11 then detects the positions and average luminances of the cell body B and the neurites L1 and L2 and transmits them to the condition-changing unit 13.

The condition-changing unit 13 retrieves the desired luminances of the cell body B and the neurites L1 and L2 from the template data. For example, the condition-changing unit 13 compares the actual average luminance X1 of the cell body B in the image with a desired luminance Y1, the actual average luminance X2 of the neurite L1 in the image with a desired luminance Y2, and the actual average luminance X3 of the neurite L2 in the image with a desired luminance Y3, and calculates their respective brightness ratios Y1/X1, Y2/X2, and Y3/X3. The image-analyzing unit 11 may classify the extracted examination targets into two types, i.e., the cell body B and the neurites L, and retrieve the desired luminance of the cell body B and the desired luminance of the neurites L from the template data.

The condition-changing unit 13 then multiplies the laser power, serving as the predetermined irradiation condition, and the gain, serving as the predetermined image generation condition, for each of the cell body B and the neurites L1 and L2 by the corresponding brightness ratio to determine a new irradiation condition and a new image generation condition for each of the cell body B and the neurites L1 and L2 (step S3). The condition-changing unit 13 then sets the new irradiation condition and the new image generation condition determined for each of the cell body B and the neurites L1 and L2 (step S4).

The control unit 7 then redrives the light source 3 and the image-generating unit 5 depending on the irradiation condition and the image generation condition changed for each of the cell body B and the neurites L1 and L2 by the condition-changing unit 13. In this case, each of the cell body B and the neurites L1 and L2 is scanned with laser light emitted under the irradiation condition changed for each of the cell body B and the neurites L1 and L2 by the examination optical system, and based on fluorescence emitted from the cell body B and the neurites L1 and L2, an image is generated under the image generation condition changed for each of the cell body B and the neurites L1 and L2 (step S5).

Figure 4A:
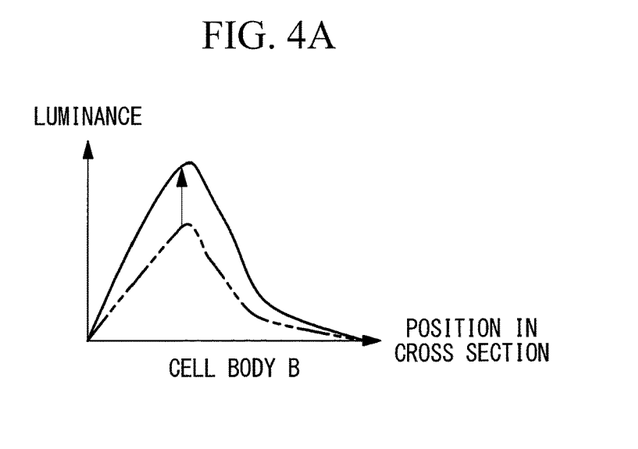
FIG. 4A is a graph showing the luminances of a cell body of the cell in precapturing and main capturing.
Figure 4B:
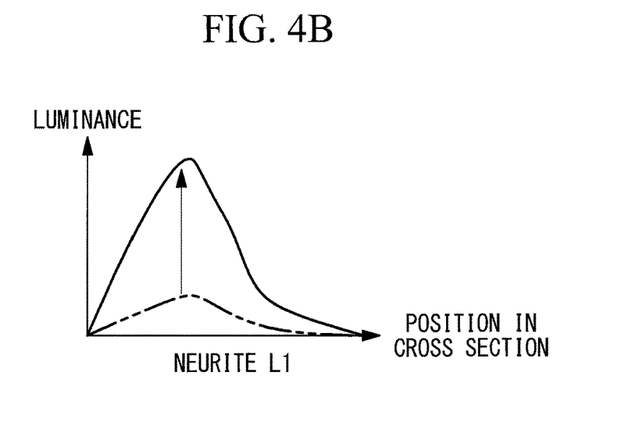
FIG. 4B is a graph showing the luminances of a neurite of the cell in precapturing and main capturing.
Figure 4C:
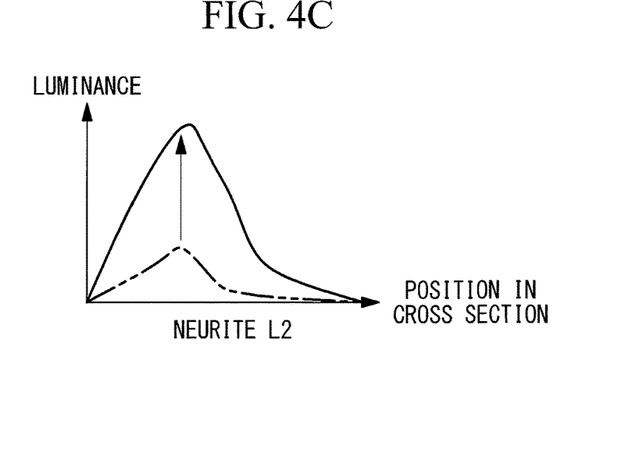
FIG. 4C is a graph showing the luminances of another neurite of the cell in precapturing and main capturing.

As shown in FIGS. 4A, 4B, and 4C, the luminance of each of the cell body B and the neurites L1 and L2 in the image is corrected to the desired luminance, and they are displayed on the monitor 9. In FIGS. 4A, 4B, and 4C, the vertical axis indicates the luminance, and the horizontal axis indicates the position in a cross section. The two-dot chain line indicates the luminance in precapturing, and the solid line indicates the luminance in main capturing. Thus, the specimen S can be examined in an image in which the cell body B and the neurites L1 and L2 are displayed with their respective desired luminances.

As described above, even if the examination targets in the specimen S vary in brightness, such as the cell body B, which has a higher luminance, and the neurites L1 and L2, which have a lower luminance, the microscope apparatus 1 according to this embodiment displays each examination target with the desired luminance in the image, thereby facilitating examination. The image-analyzing unit 11 prevents noise such as dust from being misidentified as part of the specimen S and selected as an examination target. This allows accurate examination of a plurality of examination targets in the specimen S under the optimum examination conditions. The microscope apparatus 1 according to this embodiment, which does not have to generate a plurality of images by irradiating the specimen S with laser light multiple times, requires a shorter time for image acquisition and thus suppresses fading of fluorescence.

Although this embodiment is illustrated with the cell body B and the neurites L1 and L2 in the specimen S serving as examples of the examination targets, the examination targets may instead be, for example, a plurality of cells, and the irradiation condition and the image generation condition may be adjusted for each cell to correct the luminance thereof to the desired luminance.

Figure 5A:
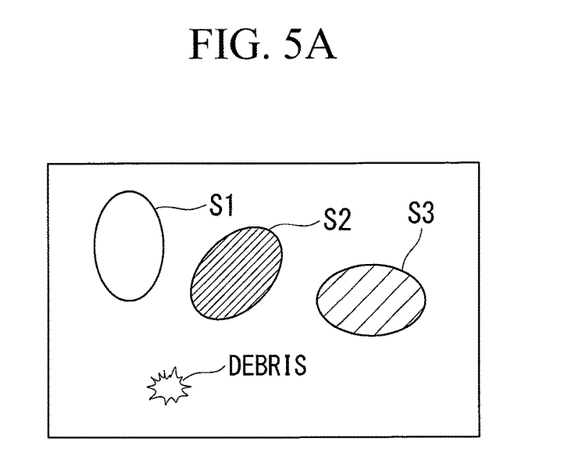
FIG. 5A is a diagram illustrating an image captured by precapturing.
Figure 5B:
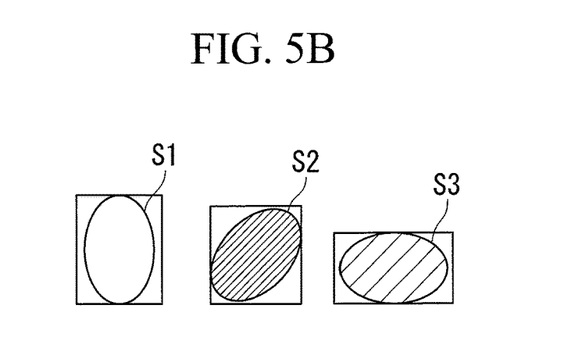
FIG. 5B is a diagram illustrating cells identified in the image in FIG. 5A.

In this case, the image-analyzing unit 11 may analyze an image captured by precapturing, as shown in FIG. 5A, identify cells S1, S2, and S3 as specimens S, for example, depending on the difference in size or shape, as shown in FIG. 5B, and extract them as examination targets. This allows noise such as dust to be eliminated from the examination targets.

Figure 5C:
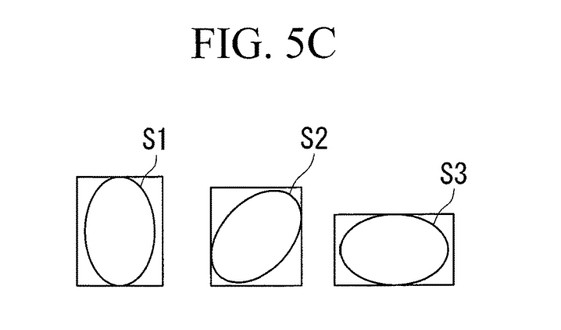
FIG. 5C is a diagram illustrating the cells identified in FIG. 5B after the luminances thereof are corrected.

The condition-changing unit 13 may then compare the actual luminance of each of the cells S1, S2, and S3 in the image with the desired luminance, calculate the brightness ratio thereof, and change the irradiation condition and the image generation condition for each of the cells S1, S2, and S3 before main capturing. As shown in FIG. 5C, the luminance of each of the cells S1, S2, and S3 in the image may be normalized to the desired luminance, and they may be displayed on the monitor 9.

Figure 6:
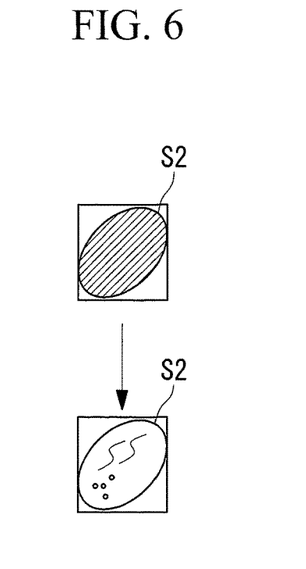
FIG. 6 is a diagram illustrating a cell before and after the luminance thereof in the image is corrected.
Figure 7:
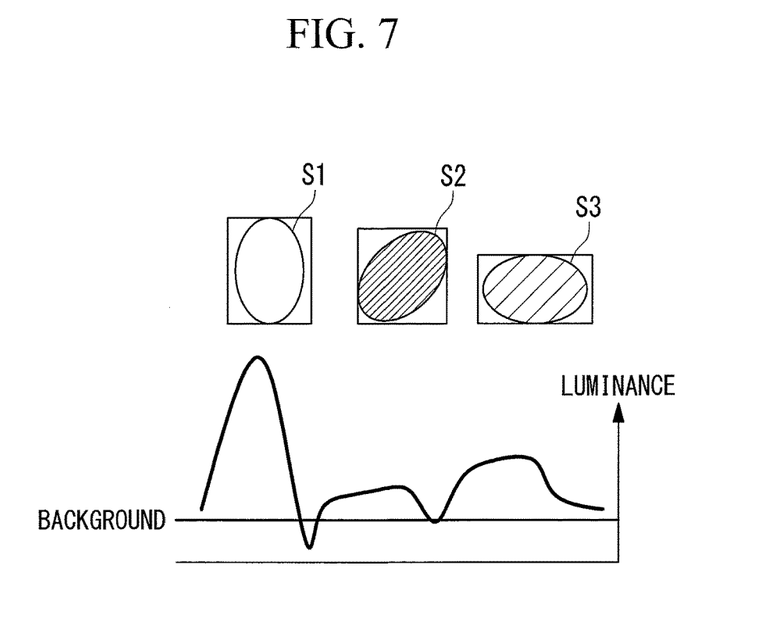
FIG. 7 is a diagram illustrating the luminance of each cell in the image captured by precapturing.

In this manner, even if the cells S1, S2, and S3 to be examined vary in brightness, these specimens S1, S2, and S3 can be accurately examined under their respective optimum examination conditions. Thus, as shown in FIG. 6, the cell S2, which would normally appear dark, can be displayed so that its fine features and structures, such as particles and wrinkles, are clearly visible, thereby allowing more accurate examination. As shown in FIG. 7, even if the cells S2 and S3 are less visible because of their low contrast relative to the background, the contrast between the cells S2 and S3 and the background can be enhanced so that they are as visible as the cell S1, thereby facilitating examination. In FIG. 7, the vertical axis indicates the luminance, and the horizontal axis indicates the positions of the cells S1, S2, and S3.

Figure 8:
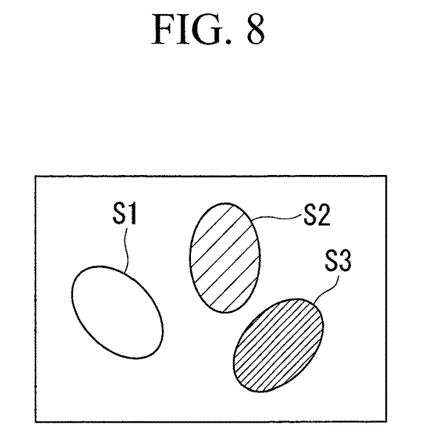
FIG. 8 is a diagram illustrating regions containing a plurality of pixels.
Figure 9:
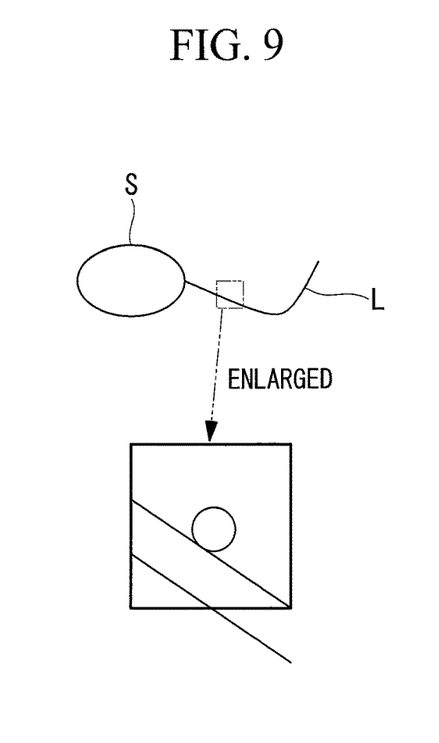
FIG. 9 is a diagram illustrating one pixel corresponding to part of a neurite of a cell.

As shown in FIG. 8, the irradiation condition and the image generation condition may be changed to perform examination for each region containing a plurality of pixels. As shown in FIG. 9, the irradiation condition and the image generation condition may be changed to perform examination for each pixel in an image. FIG. 9 illustrates an image displayed under the irradiation condition and the image generation condition corrected for the pixel corresponding to part of a neurite L.

In this manner, even if examination targets in an image vary in luminance, as in the case where cells are placed in different environments depending on the position and the ambient cell density, or if there are variations in factors such as the fluorescence properties of cell components and the degree of expression of a fluorescent protein, the desired range can be selectively examined under the optimum examination conditions depending on the purpose and mode of examination.

Figure 10A:
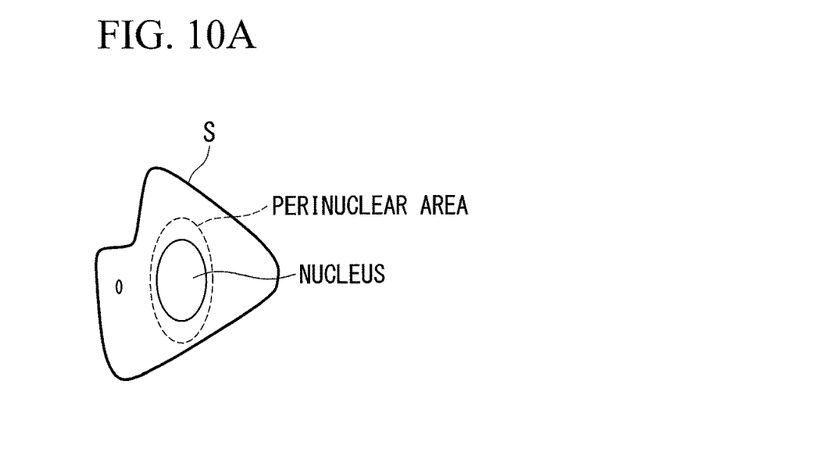
FIG. 10A is a diagram illustrating a nucleus and a perinuclear area of a cell.
Figure 10B:
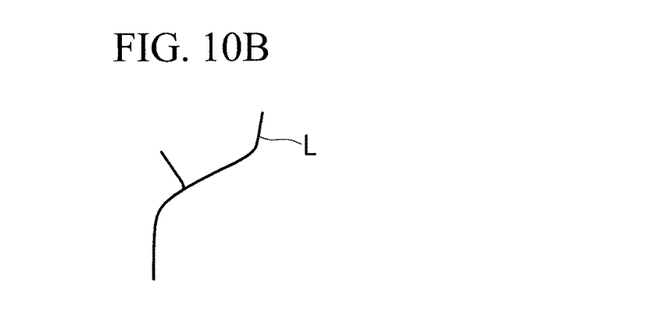
FIG. 10B is a diagram illustrating a branched neurite of a cell.

For example, as shown in FIG. 10A, the smaller components of the cell serving as the specimen S, such as the cytoplasm, organelles, nucleus, and perinuclear area, may be examined. As shown in FIG. 10B, the branches of the neurite L may be examined.

Figure 11:
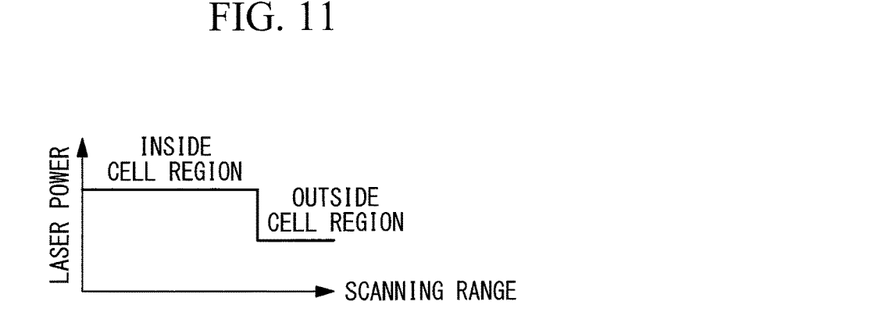
FIG. 11 is a graph illustrating a difference in laser power between a region containing a cell to be examined and a region not containing the cell.

The position to be examined may be divided into smaller regions. For example, as shown in FIG. 11, a region containing the cell to be examined and a region not containing the cell may be examined under different irradiation conditions and image generation conditions. In this case, for example, the irradiation condition, i.e., the laser power, may be increased in the region containing the cell, whereas the laser power may be zero in the region not containing the cell. In FIG. 11, the vertical axis indicates the laser power, and the horizontal axis indicates the scanning range of laser light.

The irradiation condition and the image generation condition may be simultaneously changed for each plurality of cells.

This embodiment is illustrated with the gain serving as an example of the image generation condition, the image generation condition may instead be, for example, the exposure time or applied voltage (HV) of the image-generating unit 5.

Figure 12:
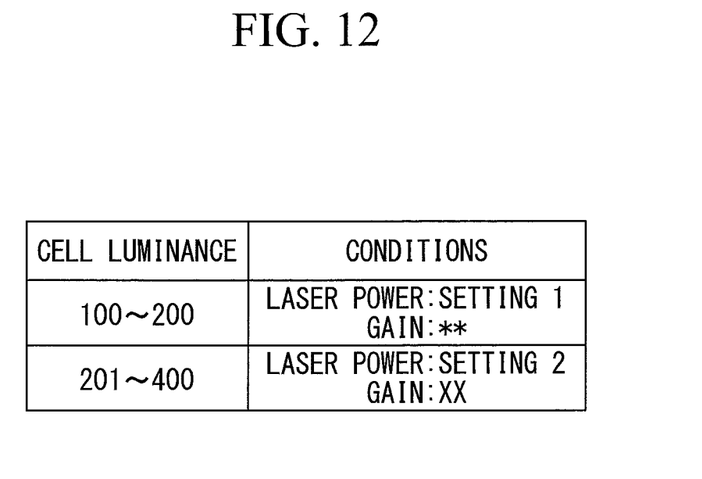
FIG. 12 is a diagram illustrating an example of a table that associates the luminance of a specimen with laser power and gain.

In this embodiment, instead of the template data, the condition-changing unit 13 may store, for example, a table, as shown in FIG. 12, that associates the luminance of the specimen S with the laser power and the gain and, with reference to this table, may change the laser power and the gain depending on the luminance of each examination target in the image to correct the luminance of each examination target to the desired luminance.

The use of a table or calculation formula prepared in advance allows the irradiation condition and the image generation condition to be quickly and easily changed during examination. This reduces the possibility of missing the desired examination timing.

This embodiment is illustrated with the condition-changing unit 13 changing the irradiation condition and the image generation condition based on the ratio of the actual luminance of an examination target in an image to the desired luminance, the condition-changing unit 13 may instead calculate the difference between the actual luminance of an examination target in an image and the desired luminance and may change the irradiation condition and the image generation condition based on the calculated difference. In this case, the laser power of the light source 3 or the gain of the image-generating unit 5 may be increased by this difference.

This embodiment is illustrated with the condition-changing unit 13 changing both of the irradiation condition and the image generation condition, the condition-changing unit 13 may correct the luminance of an examination target by changing one of them.

In the above described embodiment, the control unit may be implemented by a computer which controls the light source and the image-generating unit in accordance with control programs. In addition, the computer may execute various programs to implement functions corresponding to the image-analyzing unit and the condition-changing unit. The computer may be provided with a CPU, a RAM, and a ROM, for example. In addition, the control unit, image-analyzing unit, and condition-changing unit may be implemented by any combination of software and hardware components. For example, the computer may be provided which executes functions corresponding to the control unit, image-analyzing unit, and condition-changing unit, or these units may be implemented by any combination of processors, a single electronic circuit, or a combination of dedicated electronic circuits. Further, an additional non-volatile memory such as a flash memory may be provided, which may store data used by the respective units, such as the template data or table.

The invention claimed is:

1. A control method for a microscope apparatus which comprises a scanner, a light source that emits illumination light, and an image-generating unit including an image sensor, the method comprising:
   performing precapturing to capture a first image of a specimen, wherein the precapturing comprises controlling the light source to operate under a predetermined irradiation condition to emit illumination light, scanning the illumination light emitted by the light source operating under the predetermined irradiation condition across the specimen with the scanner, and controlling the image-generating unit to operate under a predetermined image generation condition to generate the first image of the specimen by detecting fluorescence emitted from the specimen when the specimen is scanned with the illumination light emitted from the light source under the predetermined irradiation condition;
   analyzing the generated first image to extract a plurality of examination targets of the specimen in the first image, the first image being a single image, and to detect an actual luminance of each of the extracted examination targets in the same single first image;
   changing at least one of the irradiation condition and the image generation condition for each of the examination targets in the same single first image based on a difference between the actual luminance of each of the extracted examination targets detected in the same single first image and a desired luminance; and
   performing main capturing to capture a second image of the specimen which includes the examination targets, wherein the main capturing comprises redriving the light source, scanning illumination light emitted by the redriven light source across the specimen with the scanner, and redriving the image-generating unit to generate the second image, which is a single image, wherein, in the main capturing, the light source and the image-generating unit are redriven under the changed at least one of the irradiation condition and the image generation condition, and
   wherein, in the changing of the at least one of the irradiation condition and the image generation condition, the changed at least one of the irradiation condition and the image generation condition is set such that an actual luminance of each of the examination targets in the same single second image satisfies the desired luminance.

2. The method according to claim 1, wherein in the performing of the main capturing, the at least one of the irradiation condition and the image generation condition is changed for each of the examination targets, for each pixel in the second image, or for each region containing a plurality of pixels.

3. The method according to claim 1, wherein in the changing of the at least one of the irradiation condition and the image generation condition, the at least one of the irradiation condition and the image generation condition is changed based on a table or a calculation formula that associates the examination targets with the desired luminance.

4. The microscope apparatus according to claim 1, wherein the irradiation condition is a laser power which indicates an intensity of a laser light.

5. The microscope apparatus according to claim 1, wherein the image generation condition is a gain by which an image signal is amplified.

* * * * *